United States Patent [19]

Stanley

[11] 4,234,552
[45] Nov. 18, 1980

[54] STABILIZATION OF SULPHUR

[75] Inventor: Grahame L. Stanley, Ockbrook, England

[73] Assignee: Courtaulds Limited, London, England

[21] Appl. No.: 79,940

[22] Filed: Sep. 28, 1979

[30] Foreign Application Priority Data

Oct. 18, 1978 [GB] United Kingdom ............... 41114/78

[51] Int. Cl.³ .............................................. C01B 17/12
[52] U.S. Cl. .................. 423/268; 423/567 R; 260/793
[58] Field of Search .................. 423/268, 567 R, 578; 260/793

[56] References Cited

U.S. PATENT DOCUMENTS

| 1,674,122 | 6/1928 | Powers | 260/793 |
| 2,453,689 | 11/1948 | Beaver | 260/793 |
| 2,757,075 | 7/1956 | Haimsohn | 423/567 X |

Primary Examiner—G. O. Peters
Attorney, Agent, or Firm—Davis, Hoxie, Faithfull & Hapgood

[57] ABSTRACT

Sulphur is stabilized in a form wholly or partially insoluble in carbon disulphide by incorporating therewith a dixanthogen of the formula

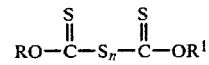

wherein R and R¹ are each independently an alkyl, cycloalkyl, aralkyl or aryl group and may be substituted by halogen or alkoxy and n is 2 or 4. The insoluble sulphur can for example be plastic sulphur or white sulphur or substantially wholly insoluble sulphur derived therefrom. The sulphur is particularly useful in the vulcanization of rubber.

7 Claims, No Drawings

STABILIZATION OF SULPHUR

This invention relates to the stabilisation of sulphur in its $CS_2$-insoluble form. The most common and stable form of sulphur is rhombic sulphur which is soluble in carbon disulphide but allotropes such as plastic sulphur and white sulphur are partially insoluble in carbon disulphide. Plastic sulphur is prepared by quenching molten sulphur from above 160° C. to 60° C. or below. White sulphur is prepared by quenching sulphur vapour, for example with carbon disulphide at 60° C. or below. In this specification we refer to sulphur insoluble in carbon disulphide at 20° C. as "insoluble sulphur".

The major use of insoluble sulphur is as a vulcanising agent for rubber. Common soluble sulphur tends to cause blooming, i.e. deposition of sulphur inside or at the surface of the rubber. The use of all or some, for example 40–100 percent by weight, of the sulphur in the form of insoluble sulphur can prevent blooming. However, insoluble sulphur is unstable and tends to revert to rhombic sulphur. This is true of the insoluble part of both plastic sulphur and white sulphur. This reversion occurs only slowly at ambient temperature but more rapidly at higher temperatures, for example within 10–20 minutes at 110° C. Thus, if a rubber compound is held at high temperature before vulcanisation, the benefits of insoluble sulphur may be lost.

Various agents have been suggested for the stabilisation of insoluble sulphur. For example, bromine is suggested in British Pat. Nos. 646,916 and 652,421, iodine in British Pat. No. 646,916, sulphur monochloride in British Pat. No. 646,916 and U.S. Pat. No. 2,460,365, turpentine and pinene in U.S. Pat. No. 2,462,146 and indene, dicyclopentadiene or styrene in British Pat. No. 1,075,569. When these stabilising agents are added to substantially pure insoluble sulphur at their optimum concentration, the treated insoluble sulphur generally has a heat stability such that 50–60 percent of the sulphur remains as insoluble sulphur after 3 hours at 90° C.

According to the invention, sulphur, of which at least 30 percent by weight is insoluble in carbon disulphide at 20° C., has incorporated therewith as stabiliser a dixanthogen of the formula

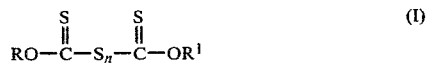

(I)

where R and $R^1$ are each independently an alkyl, cycloalkyl, aralkyl or aryl group and may be substituted by halogen or alkoxy and n is 2 or 4.

The dixanthogen is preferably a lower alkyl dixanthogen of the formula

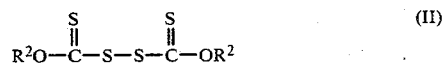

(II)

in which $R^2$ is an alkyl group having 1–4 carbon atoms, for example the diethyl compound, O,O-diethyl dithio-bis (thionoformate), or the di-isopropyl compound, O,O-di-isopropyl dithio-bis (thionoformate).

Alternative compounds which have been successfully tested are those of formula (II) in which $R^2$ is methyl and benzyl and that of formula (I) in which $R=R^1=$ethyl and $n=4$. The dixanthogen is preferably used at a concentration of 0.1–5.0 percent, most preferably 0.5–3.0 percent, by weight based on total sulphur.

The dixanthogen should be free of xanthates which accelerate the conversion of insoluble sulphur to soluble sulphur if the best effect is to be achieved.

The sulphur can be plastic sulphur or white sulphur, each of which normally contains 30 to 40 percent by weight of insoluble sulphur. In one preferred process, the sulphur treated with the dixanthogen is insoluble sulphur freshly washed with carbon disulphide so that it has an insoluble content of substantially 100 percent, i.e. it is the insoluble sulphur derived from plastic sulphur or white sulphur. The insoluble sulphur from plastic sulphur is preferred because it is more easily manufactured. The insoluble sulphur from white sulphur has generally been considered to be somewhat more stable than the insoluble sulphur from plastic sulphur but we have found that by means of the present invention we can stabilise insoluble sulphur made from plastic sulphur so that up to 95 percent stays insoluble after 3 hours at 90° C. This is sufficiently stable for use in rubber vulcanisation and generally makes the use of insoluble sulphur from the more expensive white sulphur unnecessary.

The sulphur to be stabilised can be obtained, for example, by extruding molten sulphur, e.g. at a temperature of about 200° C., into an aqueous quench bath at 0°–60° C. to form a plastic sulphur, usually containing about 30–40 percent insoluble sulphur. The molten sulphur used should be of high purity, preferably at least 99.8 percent. The plastic sulphur is then preferably washed with carbon disulphide to remove soluble sulphur. One preferred method of adding the dixanthogen to the insoluble sulphur is to add it to a slurry of the insoluble sulphur in carbon disulphide. The slurry can then be filtered or evaporated to recover the insoluble sulphur. Evaporation is preferred. We have found that about 1 percent by weight dixanthogen is chemically attached to the insoluble sulphur so that it remains with the sulphur after filtration. However, an increasing amount of dixanthogen up to 2 or even 5 percent by weight increases the heat stability of the insoluble sulphur and this can be retained with the sulphur by evaporating the slurry.

The invention is illustrated by the following Examples 1–7, which should be compared with comparative Examples 8–21, and in Examples 22 (which also contains comparative data) and 23–34. In all the Examples and comparative Examples percentages are by weight.

EXAMPLES 1–7

Sulphur of at least 99.9 percent purity was melted and heated to 220° C. and extruded into a water bath held at 20° C. to form plastic sulphur. The extruded strands of sulphur were held for 3 hours at 60° C. to harden them, then sub-divided into chips. The chips were extracted with carbon disulphide in 3 countercurrent extractions. 33.5 percent of the sulphur remained as insoluble sulphur and was slurried in fresh carbon disulphide.

The slurry of insoluble sulphur in carbon disulphide was divided into several portions and the dixanthogens $(C_2H_5OCSS)_2$ and $(iso-C_3H_7OCSS)_2$ were added to the surry at the concentrations shown (based on insoluble sulphur). The carbon disulphide was then flashed off.

Samples of the treated insoluble sulphur were then placed in an oven at 90° C. for 3 hours to determine their heat stability. After heating, 10 grams sulphur were stirred with 200 ml carbon disulphide and the percentage of insoluble sulphur remaining was calculated. The results are shown in the following Table 1.

COMPARATIVE EXAMPLES 8-21

For comparison, a variety of known additives for increasing the stability of insoluble sulphur were added to the insoluble sulphur and tested as described above. These results are also shown in Table 1.

TABLE 1

| No. | Stabiliser | Concentration. | Stability of Insoluble Sulphur. |
|---|---|---|---|
| Examples | | | |
| 1. | $(C_2H_5OCSS)_2$ | 0.1% | 59.2% |
| 2. | $(C_2H_5OCSS)_2$ | 0.5% | 70.4% |
| 3. | $(C_2H_5OCSS)_2$ | 1.0% | 87.3% |
| 4. | $(C_2H_5OCSS)_2$ | 2.0% | 89.3% |
| 5. | $(C_2H_5OCSS)_2$ | 3.0% | 91.0% |
| 6. | $(C_2H_5OCSS)_2$ | 5.0% | 91.3% |
| 7. | $(iso-C_3H_7OCSS)_2$ | 2.0% | 79.4% |
| Comparative Examples | | | |
| 8. | Iodine | 0.1% | 48.0% |
| 9. | Iodine | 0.5% | 55.2% |
| 10. | Iodine | 1.0% | 57.9% |
| 11. | Iodine | 2.0% | 45.0% |
| 12. | Styrene with di- | 0.1% | |
| 13. | chloracetic acid | 0.05% | 54.1% |
| 13. | Bromine | 0.5% | 49.1% |
| 14. | Bromine | 1.0% | 54.7% |
| 15. | Bromine | 2.0% | 55.0% |
| 16. | $S_2Cl_2$ | 0.5% | 51.8% |
| 17. | $S_2Cl_2$ | 1.0% | 55.4% |
| 18. | $S_2Cl_2$ | 2.0% | 57.9 |
| 19. | Pinene | 0.5% | 37.0% |
| 20. | Pinene | 1.0% | 42.3% |
| 21. | Pinene | 2.0% | 38.1% |

The stabiliser which has been most successfully used in commercial practice is believed to be iodine at about 1.0 percent. Stabilisers according to the invention, particularly $(C_2H_5OCSS)_2$, show a marked improvement over this.

EXAMPLE 22

Insoluble sulphur was prepared on pilot plant scale via plastic sulphur as described in Example 1, the yield of insoluble sulphur being 40 percent. To produce sample 1, the sulphur was slurried in carbon disulphide, 1.0 percent of the dixanthogen $(C_2H_5OCSS)_2$ was added as stabiliser and the carbon disulphide was flashed off.

The stabilised insoluble sulphur formed (sample 1) was tested for thermal reversion at various temperatures using a thermostatically controlled paraffin oil bath in a procedure devised by Goodyear Tyre and Rubber Company. Commercial samples of stabilised sulphur were also tested by way of comparison. Sample A is available commercially in U.K. and is derived from plastic sulphur. Sample B is available commercially in U.S.A. and is derived from white sulphur. The results are shown in Table 2.

TABLE 2

Percentage by weight of sulphur remaining insoluble after stated time.

| At 130° C. Sulphur | 1 min | 2 min | 3 min | 4 min |
|---|---|---|---|---|
| Sample 1 | 72.3 | 26.8 | 10.1 | 3.0 |
| Sample B | 72.4 | 29.3 | 8.5 | 3.4 |
| Sample A | 48.7 | 16.2 | 5.9 | 1.0 |

| At 120° C. Sulphur | 1 min | 2 min | 3 min | 4 min |
|---|---|---|---|---|
| Sample 1 | 87.5 | 77.7 | 66.2 | 56.2 |

TABLE 2-continued

Percentage by weight of sulphur remaining insoluble after stated time.

| | | | | |
|---|---|---|---|---|
| Sample B | 94.4 | 83.9 | 65.6 | 42.8 |
| Sample A | 84.3 | 63.2 | 53.2 | 38.3 |

| At 110° C. Sulphur | 5 min | 10 min | 15 min | 20 min | 25 min |
|---|---|---|---|---|---|
| Sample 1 | 91.0 | 83.0 | 71.8 | 63.3 | 49.4 |
| Sample B | 74.9 | 61.0 | 30.9 | 11.1 | 5.7 |
| Sample A | 83.7 | 63.4 | 39.2 | 22.7 | 16.1 |

| At 100° C. Sulphur | 15 min | 30 min | 45 min | 60 min | 90 min |
|---|---|---|---|---|---|
| Sample 1 | 99.6 | 97.8 | 96.0 | 94.8 | 91.5 |
| Sample B | 90.4 | 82.3 | 73.7 | 66.0 | 55.1 |
| Sample A | 91.3 | 87.3 | 83.7 | 79.7 | 73.0 |

As shown in Table 2, sulphur produced according to the invention has superior stability at all temperatures to the commercial sample A and also has superior stability at 100° C. and 110° C. to commercial sample B produced from more expensive white sulphur. These are the temperatures most commonly encountered in rubber processing. At 130° C. reversion occurs rapidly in all cases. It is believed that at this temperature fission of the polymeric sulphur chain occurs not only terminally but all along the chain and is substantially independent of any stabiliser used.

EXAMPLES 23-24

Various dixanthogen stabilisers were added to the insoluble sulphur prepared in Example 22 and the heat stability of the treated insoluble sulphur was tested at 90° C. for 30 hours as described in Example 1. The results are shown in Table 3.

TABLE 3

| Example | Stabiliser | Concentration | Stability of Insoluble Sulphur |
|---|---|---|---|
| 23 | $(CH_3OCSS)_2$ | 0.5% | 83.5% |
| 24 | " | 1.0% | 83.0% |
| 25 | " | 2.0% | 83.2% |
| 26 | $(PhCH_2OCSS)_2$ | 0.5% | 82.4% |
| 27 | " | 1.0% | 83.0% |
| 28 | " | 2.0% | 83.0% |
| 29 | $(C_2H_5OCS)_2S_4$ | 0.25% | 67.8% |
| 30 | " | 0.50% | 61.0% |
| 31 | " | 1.0% | 63.1% |
| 32 | " | 2.0% | 71.8% |
| 33 | $(iso-C_3H_7)CSS)_2$ | 1.0% | 69.5% |
| 34 | " | 2.0% | 86.3% |

What is claimed is:

1. Sulphur, of which at least 30 percent by weight is insoluble in carbon disulphide at 20° C., characterised in that the sulphur has incorporated therewith as stabiliser a dixanthogen of the formula

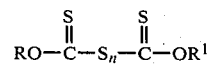

where R and $R^1$ are each independently an alkyl, cycloalkyl, aralkyl or aryl group and may be substituted by halogen or alkoxy and n is 2 or 4.

2. Sulphur according to claim 1 characterised in that the dixanthogen is O,O-diethyl dithio-bis (thionoformate).

3. Sulphur according to claim 1 characterised in that the dixanthogen is O,O-di-isopropyl dithio-bis (thionoformate).

4. Sulphur according to claim 1 characterised in that it has incorporated therewith 0.5 to 3.0 percent by weight of the dixanthogen.

5. Sulphur according to claim 1 characterised in that it is substantially 100 percent insoluble in carbon disulphide.

6. Sulphur according to claim 1 characterised in that it is derived from plastic sulphur and is substantially 100 percent insoluble in carbon disulphide.

7. A process for the preparation of sulphur which is substantially insoluble in carbon disulphide at 20° C. and which is stabilised in its insoluble form, characterised in that molten sulphur is extruded into an aqueous quench bath at 0°–60° C. and washed with carbon disulphide to remove soluble sulphur and a dixanthogen of the formula

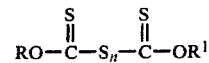

where R and $R^1$ are each independently an alkyl, cycloalkyl, aralkyl or aryl group and may be substituted by halogen or alkoxy and n is 2 or 4, is added to a slurry of the insoluble sulphur in carbon disulphide.

* * * * *